（12）United States Patent
Hoki et al.

(10) Patent No.: US 6,558,024 B2
(45) Date of Patent: May 6, 2003

(54) CASING OF IMAGE SENSOR AND METHOD OF MAKING THE SAME

(75) Inventors: Hideaki Hoki, Kyoto (JP); Hiroaki Hayashi, Kyoto (JP); Hiromi Ogata, Kyoto (JP); Kunio Motoyama, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 17 days.

(21) Appl. No.: 09/725,008

(22) Filed: Nov. 29, 2000

(65) Prior Publication Data

US 2001/0002168 A1 May 31, 2001

(30) Foreign Application Priority Data

Nov. 30, 1999 (JP) ............................................ 11-339541
Nov. 30, 1999 (JP) ............................................ 11-339542

(51) Int. Cl.[7] ................................................. B60Q 3/04
(52) U.S. Cl. .................................... 362/362; 250/208.1
(58) Field of Search ........................... 362/189, 89, 260, 362/362; 250/239, 208.1; 358/474, 492–493, 494, 495, 496, 497

(56) References Cited

U.S. PATENT DOCUMENTS

| | | | | |
|---|---|---|---|---|
| 4,477,863 A | * | 10/1984 | Walz | 362/217 |
| 4,480,294 A | * | 10/1984 | Carboni | 362/184 |
| 4,493,013 A | * | 1/1985 | Hawkins | 362/216 |
| 4,939,626 A | * | 7/1990 | Hohenstein | 362/186 |
| 5,229,596 A | * | 7/1993 | Ujihara | 44/520 |
| 5,859,421 A | | 1/1999 | Onishi et al. | 250/208.1 |

* cited by examiner

Primary Examiner—Sandra O'Shea
Assistant Examiner—John Anthony Ward
(74) Attorney, Agent, or Firm—Michael D. Bednarek; Shaw Pittman LLP

(57) ABSTRACT

A method of making a casing of an image sensor is provided. The method includes the steps of preparing the casing, and applying a static electricity preventive to the casing. The casing is formed with a light passage configured to conduct light emitted from a light source. The static electricity preventive is applied to the inner surfaces of the casing defining the light passage. While the application of the preventive is performed, flashes formed at the light passage are removed.

10 Claims, 5 Drawing Sheets

CASING OF IMAGE SENSOR AND METHOD OF MAKING THE SAME

BACKGROUND OF THE INVENTION

1. Field of the Invention

The present invention relates to a casing of an image sensor. It also relates to a method of making such a casing.

2. Description of the Related Art

A conventional contact-type image sensor may include a casing for holding necessary components such as a light source, light receiving elements, a lens array, etc. To accommodate these parts, the casing is formed with suitably configured inner spaces. Such a casing is made of a resin material by injection molding for example.

The conventional image sensor also includes a transparent cover fixed to the casing. An image-carrying document is brought into sliding contact with the cover to be illuminated by the light source. The light beams emitted from the light source are conducted to the image reading line on the transparent cover through a light conducting passage formed in the casing. The light reflected on the document will pass through the lens array and arrive at the light receiving elements. In accordance with the amount of received light, the light receiving elements output detection signals. For causing the reflected light to reach the light receiving elements, the casing is provided with a second light passage arranged between the image reading line on the cover and the light receiving elements.

The conventional image sensor has been found disadvantageous in the following point.

As stated above, the casing of the conventional image sensor may be formed by injection molding with the use of a resin material. In this instance, however, the resulting casing is liable to be electrostatically charged when the hardened resin material is detached from the mold. Disadvantageously, such static electricity may attract unwanted airborne particles or dust toward the casing. These particles may further be drawn into the light conducting spaces of the casing, where the lingering particles may disturb the passage of light. Further, the particles trapped in the light passages may eventually settle on the inner surfaces of the casing defining the light passages. As readily seen, the presence of these particles is undesirable for the inner surfaces to properly reflect light striking upon these surfaces.

Conventionally, the above problem may be addressed in two ways, as described below.

Specifically, a first way is to use an air blower which is capable of generating a fast-moving air flow toward the casing so that the accumulated dust will be blown away. However, such an air-blowing method may often prove ineffective since the electrostatically adhered dust may often fail to be detached from the casing due to the strong electrical bonding force working between the dust and the casing. Further, even if the dust has been properly detached from the casing, the swirled-up dust (together with other stirred-up particles originally present around the casing) may unfavorably be drawn back to the charged casing and settle on it.

The other or second way to address the conventional problem is to give vibrations or jolts to the casing so that the unwanted dust will be shaken off. However, in this case again, it is difficult to properly detach the dust from the casing due to the strong electrical force.

SUMMARY OF THE INVENTION

The present invention has been proposed under the above-described circumstances, and its object is to provide a casing of an image sensor which does not suffer the electrostatic adhesion of unwanted particles.

According to a first aspect of the present invention, there is provided a method of making a casing of an image sensor. The method includes the steps of preparing a casing; and applying a static electricity preventive to the casing.

In accordance with the above method, a light passage may be formed in the casing, and the preventive may preferably be applied to the light passage.

The preventive may be sprayed to the casing. It is also possible to perform the application of the preventive with the use of a movable member to be rubbed against the casing. Preferably, the movable member may be provided with a contact portion brought into contact with the casing. The contact portion maybe solid (i.e., not in the form of a liquid or gas) but elastic, so that the casing rubbed by the contact portion will not be damaged. Preferably, the contact portion may be made of polyurethane rubber.

In the above case, the preventive may be soaked into the contact portion in advance of the rubbing of the movable member.

According to a preferred embodiment of the present invention, the method may further include the step of causing the movable member to remove an unwanted projection formed on the casing. The projection may be a flash formed when the casing is produced by molding from a resin material.

According to a second aspect of the present invention, there is provided a casing of an image sensor. The casing may include a light passage, and a surface defining the light passage. Preferably, this surface may be coated by a static electricity preventive.

According to a third aspect of the present invention, there is provided an image sensor which includes a light source for illuminating an image-carrying document to be read, and a resin casing. This casing supports the light source and is provided with a light passage defined by an inner surface of the casing. Preferably, the inner surface may be coated by a static electricity preventive.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
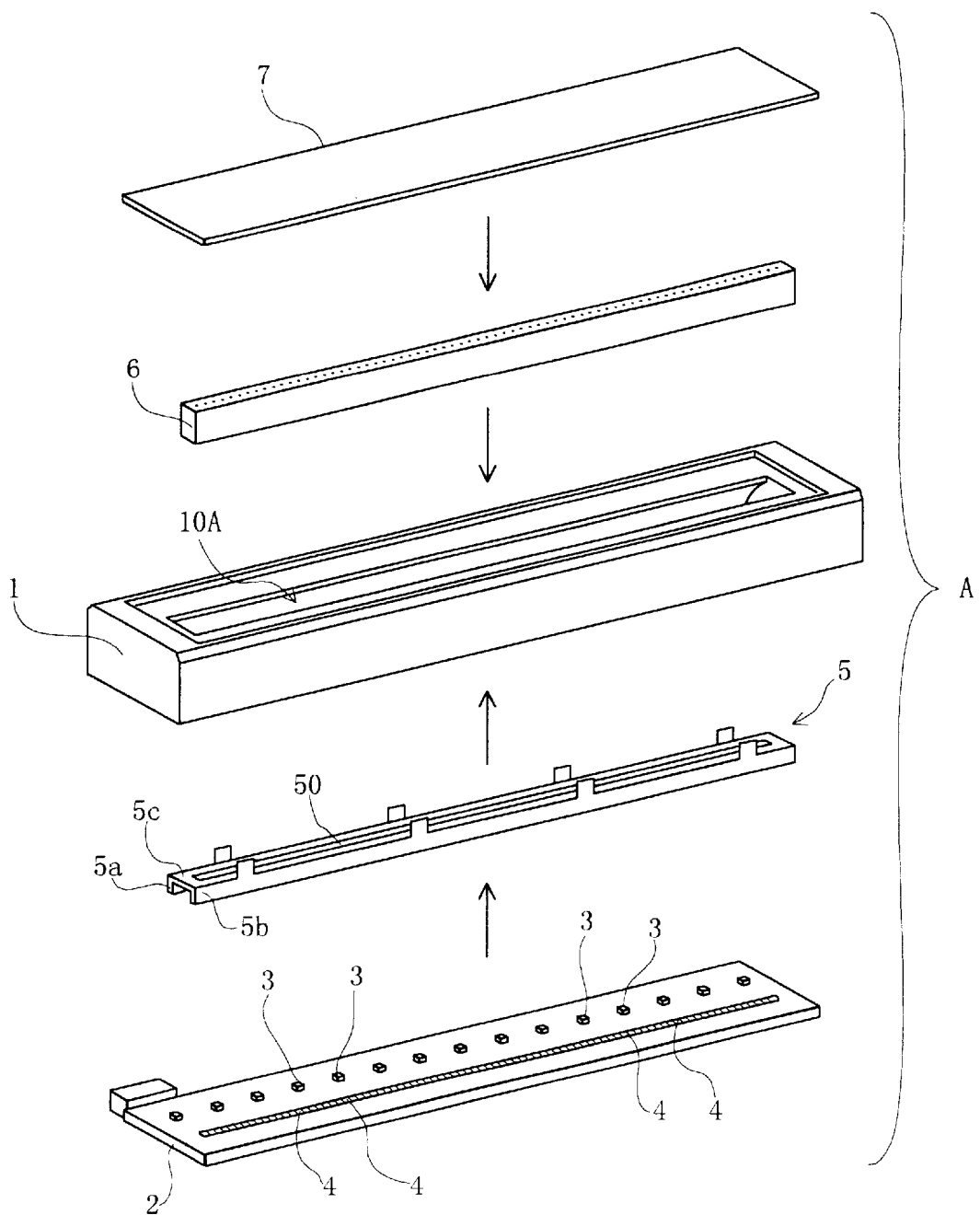
FIG. 1 is an exploded view showing the principal components of an image sensor embodying the present invention.
Figure 2:
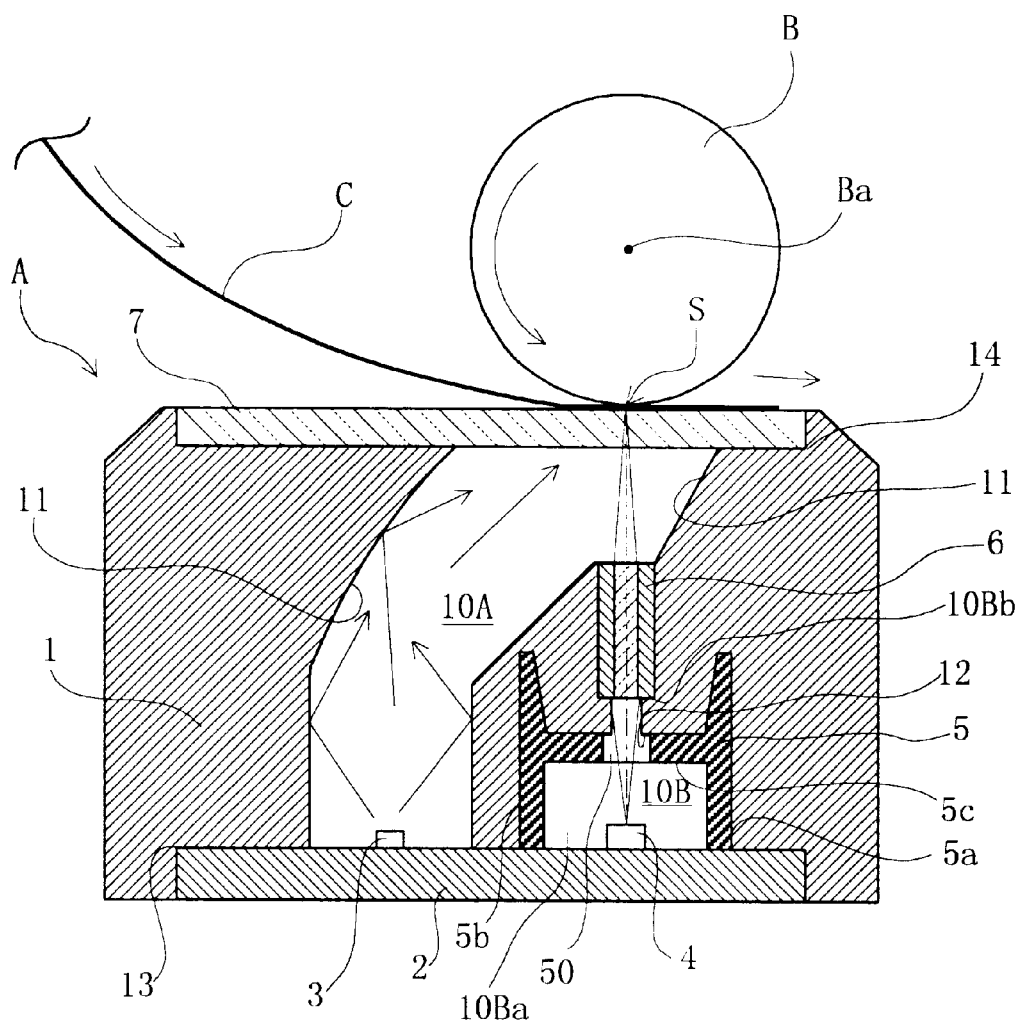
FIG. 2 is a sectional view showing the inside of the image sensor of FIG. 1.

FIG. 1 shows the principal components of an image sensor A embodying the present invention. The illustrated image sensor A includes a casing 1, an insulating substrate 2, a plurality of light sources 3, a plurality of light receiving elements 4, a light absorbing member 5, a lens array 6 and a transparent cover 7. In operation, as shown in FIG. 2, an image-carrying document C is brought into contact with the transparent cover 7 by a platen roller B disposed adjacent to the cover 7. The platen roller B is caused to rotate about a horizontal axis Ba for frictionally advancing the document C relative to the cover 7.

The casing has an elongated configuration (see FIG. 1) extending along the platen roller axis Ba (see FIG. 2). As shown in FIG. 1, the casing 1 is formed with a light conducting slit 10A extending longitudinally of the casing 1. In addition to the slit 10A, the casing 1 is formed with a relatively wide space 10Ba for accommodating the light absorbing member 5 and a relatively narrow space 10Bb for accommodating the lens array 6. Where appropriate below, the combination of the spaces 10Ba and 10Bb maybe referred to as "the second light passage", whereas the light conducting slit 10A "the first light passage."

As shown in FIG. 2, the slit 10A or first light passage 10A is inclined, at its upper portion, toward the image reading line S, while being substantially upright at its lower portion. Due to this configuration, the light emitted from the light sources 3 will be properly conducted to the image reading line S. For facilitating the light reflection, the inner surfaces 11 defining the first light passage 10A may need to be rendered white. To this end, the casing 1 as a whole may be made of a white resin material such as white-colored PC (polycarbonate) or ABS (acrylonitrile-butadiene-styrene) resin. The second light passage 10B is disposed right beneath the reading line S, so that the reflection light coming from the reading line S is led through the lens array 6 to the light receiving elements 4. Though not illustrated, a static electricity preventive is applied to the inner surfaces 11 and 12.

As shown in FIG. 2, the insulating substrate 2 is fitted into a lower recess 13 formed at the bottom of the casing 1. The light sources 3, each of which may be a light-emitting diode (LED), are mounted on the substrate 2. As shown in FIG. 1, the light sources 3 are arranged at regular intervals along a longitudinal edge of the substrate 2. The light receiving elements 4 are arranged in a line extending along the other longitudinal edge of the substrate 2. Each of the light receiving elements 4 is designed to output an image signal corresponding to the amount of the received light.

The light absorbing member 5 is rendered black as a whole, and provided with first and second leg portions 5a, 5b. These two leg portions 5a, 5b are connected by a horizontal bridge portion 5c. For allowing passage of light, the bridge portion 5c is formed with a slit 50 extending longitudinally of the light absorbing member 5. When properly assembled, as shown in FIG. 2, the light receiving elements 4 mounted on the substrate 2 are substantially enclosed by the light absorbing member 5. Thus, the light having passed through the lens array 6 will be received by the light receiving elements 4 without being unduly scattered by the inner surfaces defining the space 10Ba.

The lens array 6 consists of a plurality of self-focusing lenses held together by a resin holder, so that an image on the document C will be projected onto the the light receiving elements 4 in a non-inverted and non-magnified manner. Of course, the self-focusing lenses may be replaced by ordinary convex lenses or other kinds of lenses.

The transparent cover 7 is fitted into an upper recess 14 formed at the top surface of the casing 1. The illustrated cover 7 is made of a transparent resin material, though the present invention is not limited to this. For instance, use may be made of a transparent glass material for making the cover 7.

Figure 3:
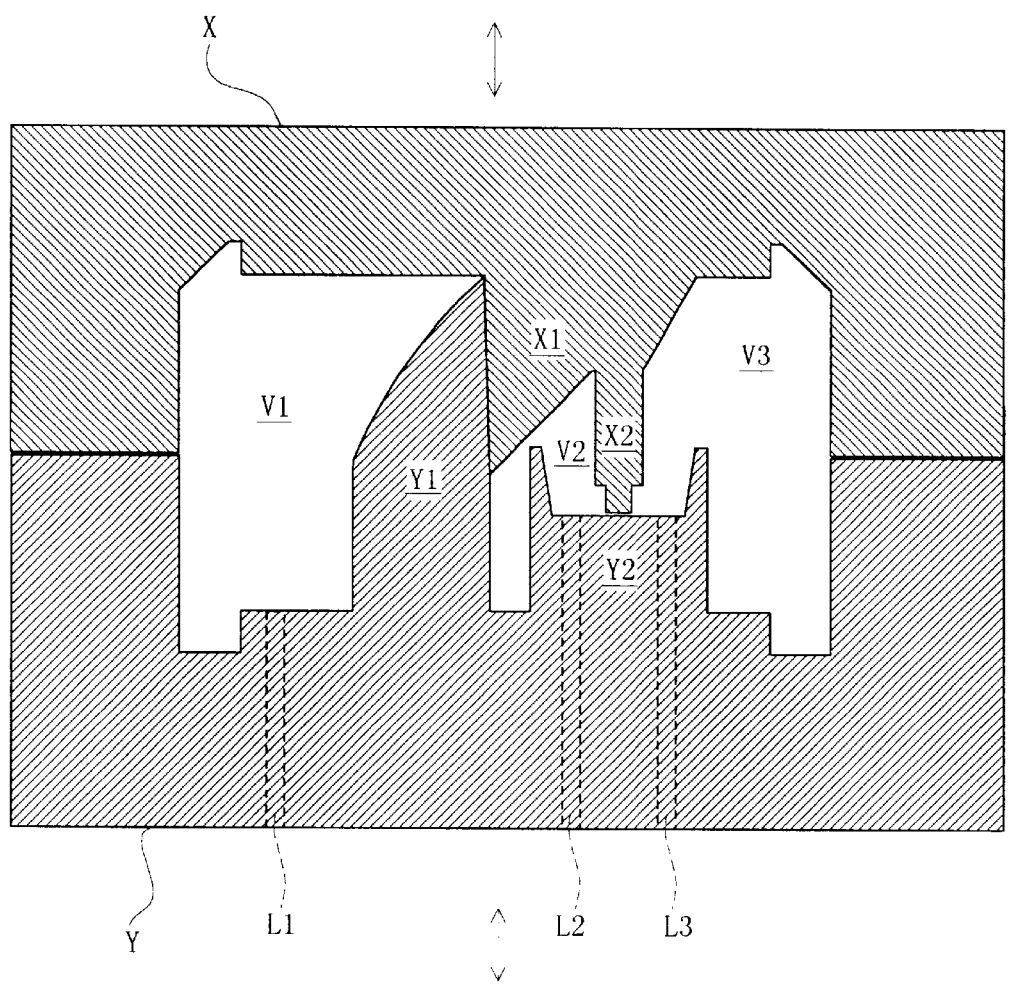
FIG. 3 is a sectional view showing a metal mold used for making the casing of the image sensor of FIG. 1.

According to the present invention, the casing 1 of the above-described image sensor A may be produced by injection molding. To this end, use may be made of an upper molding piece A and a lower molding piece Y, as shown in FIG. 3. In the illustrated example, when held closely, the upper and the lower molding pieces X and Y provide first to third spaces V1–V3, which correspond to the solid portions of the casing 1. The lower-molding piece Y is provided with first to third through-holes L1–L3 for supplying resin material to the first to the third spaces V1–V3, respectively. Such a resin supply hole may also be formed in the upper molding piece X. It should be appreciated here that the three spaces V1–V3 communicate with each other via non-illustrated connection passages, though in FIG. 3 they appear to be separated from each.

With the use of the upper and lower molding pieces X and Y, the first light passage 10A (see FIG. 2) is formed by the protrusions X1 and Y1, while the second light passage 10B is formed by the other protrusions X2 and Y2.

As previously described in connection with the prior art, the casing 1 thus obtained may have been electrostatically charged, so that it is liable to attract nearby particles or dust floating in the air.

Figure 4:
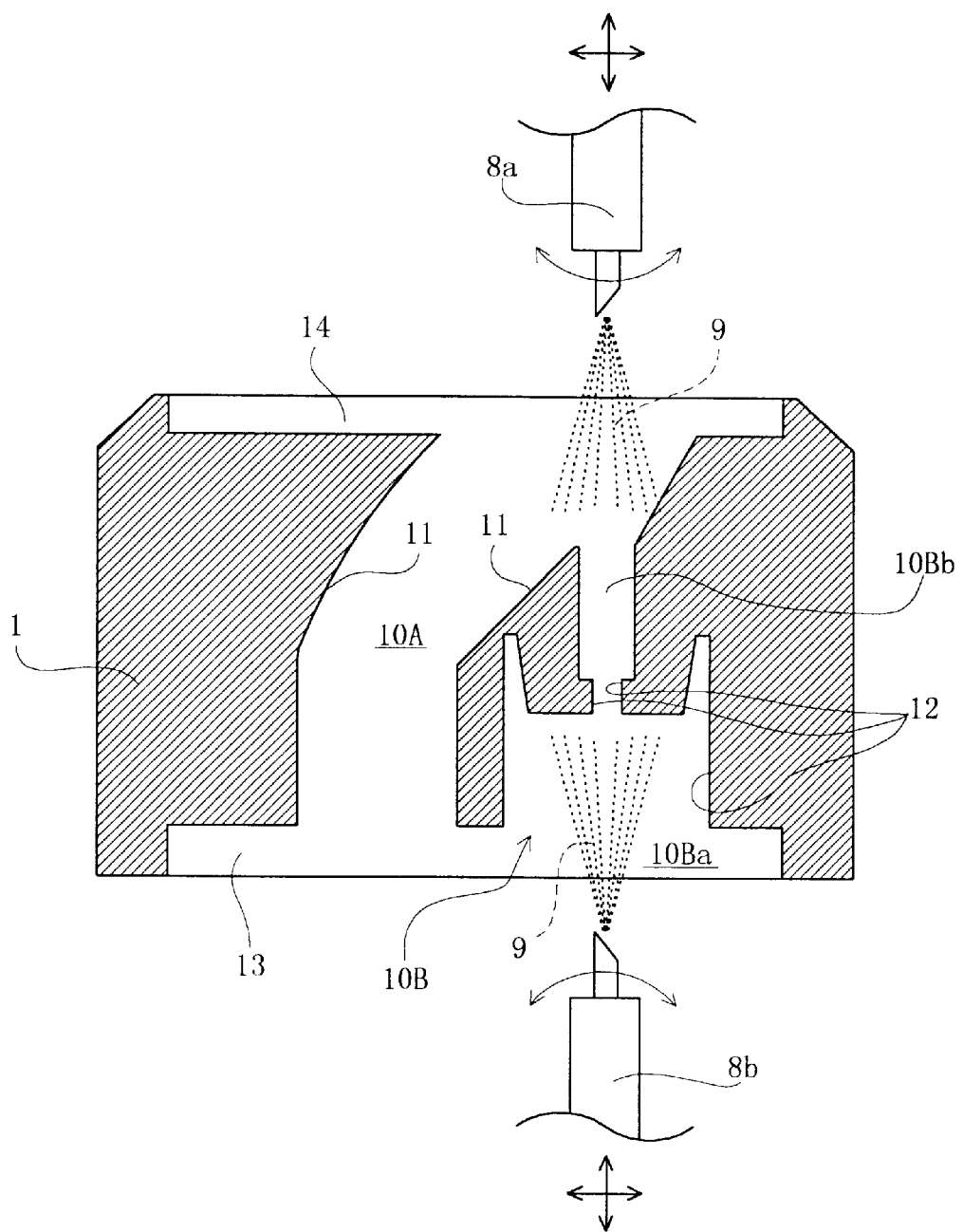
FIG. 4 is a sectional view illustrating how a static electricity preventive is applied to the casing of the image sensor.

To overcome this problem, according to the present invention, a static electricity preventive is applied to the inner surfaces 11 and 12 of the respective spaces 10A, 10B. To this end, use may be made of a spray gun, as shown in FIG. 4. In the illustrated example, two spray guns (an upper spray gun 8a and a lower spray gun 8b) are used. Each spray gun is caused to shift in position relative to the casing 1 by an non-illustrated driving mechanism. The posture of each spray gun is also changeable, so that the preventive 9 is properly applied to any part of the inner surfaces 11, 12.

Instead of using the spray guns as illustrated, the casing 1 as a whole may be immersed in a static electricity preventive.

The preventive 9 may be surface-active agents such as anionic, cationic, ampholytic or nonionic activators which serve to negate the effects of the static electricity on the casing 1. The concentration of the preventive 9 should be appropriately adjusted, so that the light reflecting properties of the inner surfaces 11, 12 will not deteriorate.

After the preventive 9 has been applied to the casing 1, the substrate 2, the lens array 6 and other necessary components are incorporated into the casing 1. Finally, the transparent cover 7 is fixed to the casing 1, whereby the image sensor A as shown in FIGS. 1 and 2 is obtained.

Figure 5:
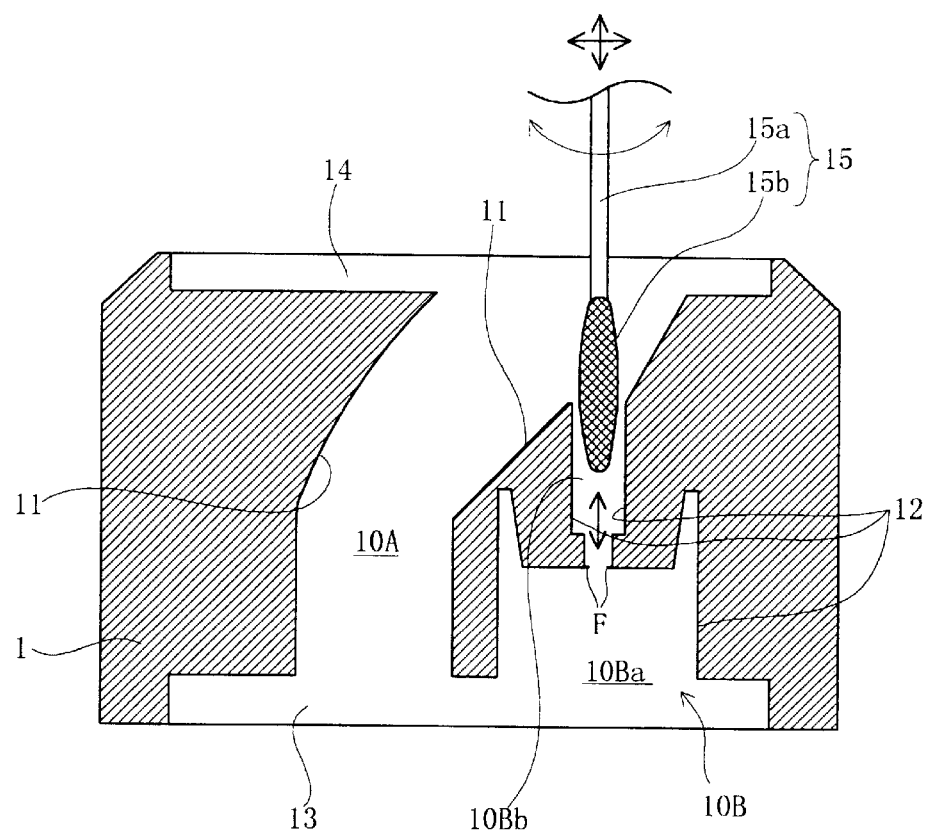
FIG. 5 is a sectional view showing another way to apply a static electricity preventive to the casing of the image sensor.

FIG. 5 shows another way to apply a static electricity preventive to the casing 1. In the illustrated example, use is made of a preventive application stick 15 consisting of a rod portion 15a and a contact portion 15b. The rod portion 15a may be made of polyurethane. The contact portion 15b may be made of a solid but elastic material, such as polyurethane rubber. Due to the elasticity of the material, the contact portion 15b will not damage the inner surfaces 11, 12. A suitable static electricity preventive is soaked into the contact portion 15b.

With the use of the stick 15, the static electricity preventive is applied to the inner surfaces 11, 12 by rubbing the contact portion 15b against these surfaces. The rod portion 15a may be attached to a non-illustrated driving mechanism for automatically actuating the stick 15.

Figure 6:
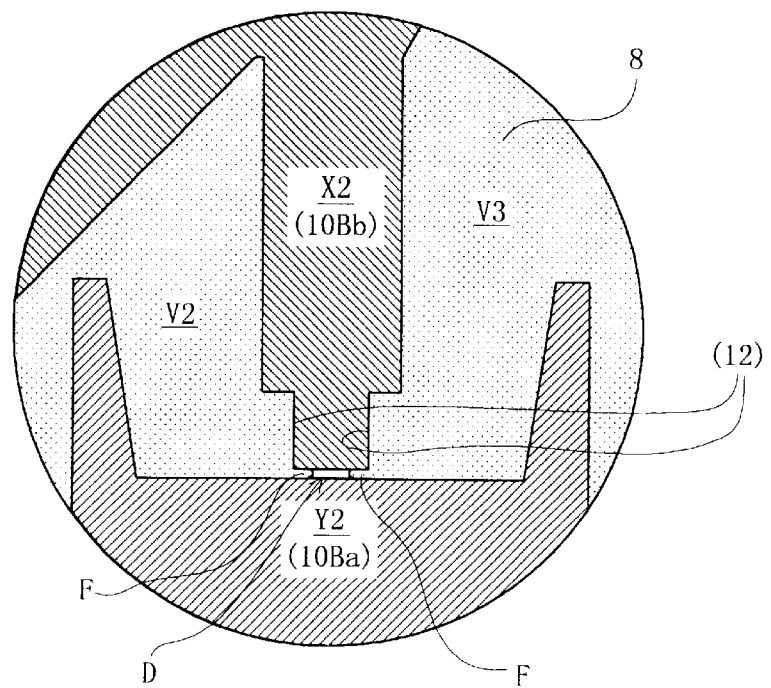
FIG. 6 is an enlarged view illustrating how a flash is made during the molding of the casing of FIG. 5.

The above-described stick 15 is also advantageous to removing unwanted protrusions or flashes which have been formed on the inner surfaces 11, 12. For instance, the flashes F formed at the constricted part of the second light passage 10B, as shown in FIG. 5, can be effectively removed through mechanical contact with the contact portion 15b of the stick 15. Such a flash may be formed when an excess molten resin material solidifies after it has been forced into a gap D between the two facing surfaces of the upper and the lower molding pieces X and Y, as shown in FIG. 6.

In the example shown in FIG. 5, only one preventive application stick 15 is provided on the upper side of the casing 1, though the present invention is not limited to this. For instance, the same or similar static electricity preventing means may be provided on the lower side of the casing 1 in addition to the illustrated stick 15. According to the present invention, the contact portion 15b may be made of cotton, bristles, etc.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A method of making a casing of an image sensor comprising the steps of:

preparing a casing having inner surfaces; and applying a static electricity preventive to the inner surfaces of the casing for preventing the inner surfaces of the casing from electrostatically attracting particles;

wherein the static electricity preventive comprises a surface-active agent.

2. The method according to claim 1, wherein the inner surfaces of the casing define a light passage, the preventive is applied to the light passage.

3. The method according to claim 1, wherein the preventive is sprayed to the inner surfaces of the casing.

4. The method according to claim 1, wherein the application of the preventive is performed through a movable member rubbed against the inner surfaces of the casing.

5. The method according to claim 4, wherein the movable member is provided with an elastic contact portion brought into contact with the inner surfaces of the casing, the preventive being soaked into the contact portion.

6. The method according to claim 5, wherein the contact portion is made of polyurethane rubber.

7. The method according to claim 4, further comprising the step of causing the movable member to remove an unwanted projection formed on the casing.

8. The method according to claim 1, wherein the casing is made of a resin material.

9. A casing of an image sensor comprising:

a light passage; and inner surfaces defining the light passage;

wherein said inner surfaces are coated with a static electricity preventive for preventing the inner surfaces from electrostatically attracting particles; and wherein the static electricity preventive comprises a surface-active agent.

10. An image sensor comprising:

a light source for illuminating an image-carrying document to be read; and a resin casing supporting the light source and provided with a light passage defined by inner surfaces of the casing;

wherein the inner surfaces are coated with a static electricity preventive for preventing the inner surfaces from electrostatically attracting particles; and wherein the static electricity preventive comprises a surface-active agent.

* * * * *